United States Patent
Blomsma et al.

(10) Patent No.: US 7,608,222 B2
(45) Date of Patent: Oct. 27, 2009

(54) ASSEMBLY AND METHOD FOR PERFORMING PARALLEL CHEMICAL EXPERIMENTS, IN PARTICULAR CRYSTALLISATION EXPERIMENTS

(75) Inventors: Erwin Blomsma, Noordwijk (NL); Adriaan Jan van Langevelde, Almeere (NL); Danny Dirk Peter Willem Stam, Den Haag (NL)

(73) Assignee: Avantium International B.V., Amsterdam (NL)

( * ) Notice: Subject to any disclaimer, the term of this patent is extended or adjusted under 35 U.S.C. 154(b) by 688 days.

(21) Appl. No.: 10/523,732

(22) PCT Filed: Aug. 2, 2003

(86) PCT No.: PCT/NL02/00526

§ 371 (c)(1),
(2), (4) Date: Sep. 29, 2005

(87) PCT Pub. No.: WO2004/012857

PCT Pub. Date: Feb. 12, 2004

(65) Prior Publication Data

US 2006/0153743 A1    Jul. 13, 2006

(51) Int. Cl.
*B01L 3/00* (2006.01)
(52) U.S. Cl. .................. 422/102; 422/100; 422/101
(58) Field of Classification Search .......... 422/100–102
See application file for complete search history.

(56) References Cited

U.S. PATENT DOCUMENTS

| 5,866,342 | A | 2/1999 | Antonenko et al. |
| 6,054,100 | A | 4/2000 | Stanchfield et al. |
| 6,274,091 | B1 | 8/2001 | Mohan et al. |
| 2003/0116497 | A1 * | 6/2003 | Carlson et al. ............. 210/435 |

FOREIGN PATENT DOCUMENTS

GB         2 370 797 A    7/2002
WO    WO 01/41918 A2    6/2001

OTHER PUBLICATIONS

Current Approaches to Macromolecular Crystallization, Alexander McPherson, European Journal of Biochemistry, Berlin, Germany, vol. 189, 1990, pp. 1-23 XP000566586.

* cited by examiner

*Primary Examiner*—Yelena G Gakh
*Assistant Examiner*—David Weisz
(74) *Attorney, Agent, or Firm*—Thomas, Kayden, Horstemeyer & Risley, LLP; Todd Deveau

(57) ABSTRACT

An assembly and method for performing parallel chemical experiments, in particular crystallisation experiments. The assembly has a main body having a first and a second face on opposite sides thereof. Multiple bores extend through said main body between said first and second face. Tubular liners are provided having openings at opposite ends thereof, each liner removably fitting in a bore in the main body. First closure means close the openings of the liners at the first face of the main body. Second closure means close the openings of the liners at the second face of the main body. The first and second closure means are fastenable to said main body, so that an experimentation chamber is defined within each liner.

18 Claims, 2 Drawing Sheets

ASSEMBLY AND METHOD FOR PERFORMING PARALLEL CHEMICAL EXPERIMENTS, IN PARTICULAR CRYSTALLISATION EXPERIMENTS

FIELD OF THE INVENTION

The present invention relates to an assembly for performing parallel chemical experiments, in particular crystallisation experiments. The present invention also relates to systems comprising such an assembly as well as methods wherein the assembly is used.

BACKGROUND OF THE INVENTION

An assembly as well as systems and methods for performing parallel crystallisation experiments are known from WO 02/06802. The known assembly comprises a microplate having multiple microwells having an opening at the top. Sealing of the wells is effected by O-ring seals around the top of each well, which are interpositioned between the microplate and a cover plate.

The known assembly is not sufficiently practical when conducting parallel experiments in high volumes, known as high throughput experimentation. In particular the known assembly is unsatisfactory when conducting parallel crystallisation experiments.

OBJECT OF THE INVENTION

An object of the present invention is to provide an improved experimentation assembly, in particular for use in crystallisation experiments.

SUMMARY OF THE INVENTION

The present invention provides an assembly for performing parallel chemical experiments, in particular crystallisation experiments, said assembly comprising:
  a main body having a first and a second face on opposite sides thereof, multiple bores extending through said main body between said first and second face,
  tubular liners having openings at opposite ends thereof, each liner removably fitting in a bore in the main body,
  first closure means for closing the openings of the liners at the first face of the main body,
  second closure means for closing the openings of the liners at the second face of the main body,
  said first and second closure means being attachable to said main body, so that an experimentation chamber is defined within each liner.

The assembly according to the invention allows for the use of tubular liners which are simple to manufacture and also can be cleaned easily prior and/or after the experiment or be simply discarded after use. Also the main body allows for an efficient cleaning of the bores, which is particularly relevant in the field of crystallisation experiments where any contamination is likely to affect the outcome of the experiment.

The present invention also relates to systems comprising the assembly of the invention and methods wherein said assembly is used.

The assembly or system according to the invention can be adavantageously ised for solid form screening of molecules, e.g. salt screening, polymorph screening, enantiomer separation screening, in particular of active pharmaceutical ingredients.

The invention and and preferred embodiments thereof are described in the claims and the following description referring to the drawings.

DETAILED DESCRIPTION OF PREFERRED EMBODIMENTS

Figure 1:
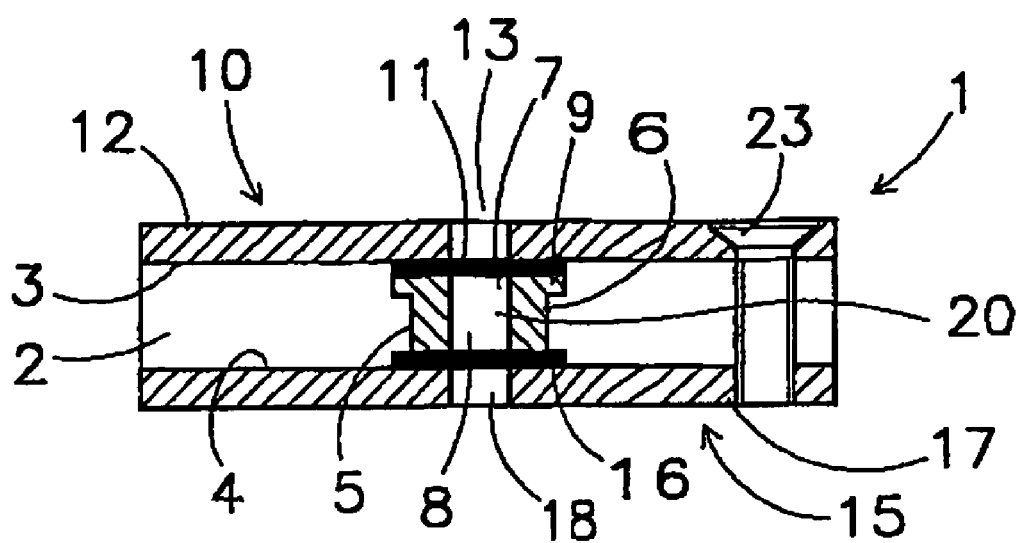
FIG. 1 shows in cross-section a part of an experimentation assembly according to the present invention.

In FIG. 1 a part of an experimentation assembly 1 for performing parallel chemical experiments, in particular crystallisation experiments, is shown.

The assembly 1 comprises a main body 2 having a first face 3 and a second face 4 on opposite sides thereof and multiple bores 5 extending through said main body 2 between said first face 3 and second face 4.

In the FIG. 1 only one bore 5 is visible. In practice the number of bores vary depending on the application. Preferably the assembly 1 has at least four bores.

In each of the bores 5 a removable tubular liner 6 is arranged. Each liner 6 has openings 7, 8 at opposite ends thereof. Each liner 6 is removably fitted in a corresponding bore 5 in the main body 2.

The assembly 1 further comprises first closure means 10 for closing the openings 7 of the liners 6 at the first face 3 of the main body 2. Also the assembly comprises second closure means 15 for closing the openings 8 of the liners 6 at the second face 4 of the main body 2.

Said first and second closure means 10, 15 are fixed with respect to said main body 2 using suitable fastening means such as bolts 23, so that an experimentation chamber 20 is defined within each liner 5 which is closed of at its ends as will be explained below.

The first closure means 10 comprise in the embodiment shown here multiple elastic first sealing members 11, corresponding to the nnumber of bores 5, and a first cover plate 12 extending over all the bores 5, so that said first sealing members 11 are interpositioned between the ends of the tubular liners 6 and the first cover plate 12.

The second closure means 15 comprise in the embodiment shown here multiple second elastic sealing members 16 and a second cover plate 17, so that said second sealing members 16 are interpositioned between the ends of the tubular liners 6 and the second cover plate 17.

The first and second sealing members 11,16 are embodied here as a sealing disc or disc shaped septum, which can be pierced by a hollow needle.

The first and second cover plates 11, 17 are each provided with bores 13, 18 extending in line with the bores 5 in the main body 2, in particular the bore in the liners 6. As the first and second sealing members 11, 16 are pierceable, a needle can be inserted into each experimentation chamber 20 e.g. for purposes explained below.

The tubular liner 6 is provided with an outwardly directed support projection in the form a circumferential support flange 9 at one end of the tubular liner 6. The main body 2 is at the first face 3 provided with an annular recess for receiving said support flange 9 as well as the sealing member 11.

Figure 2:
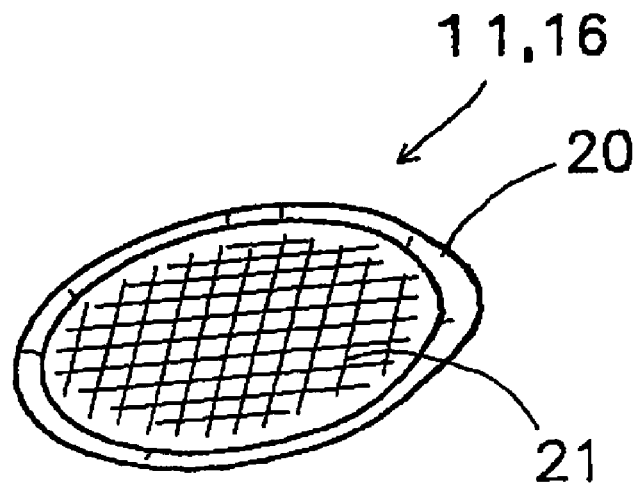
FIG. 2 shows an embodiment of the first and/or second sealing members of the assembly of FIG. 1, FIG. 3. shows a part of a filtration device to be used in combination with the experimentation assembly of the invention.

In an embodiment not shown in the drawing the first and/or second sealing members 11, 16 comprise a filter for filtering the contents of the experimentation chamber upon removal of said contents. In a practical embodiment thereof, shown in FIG. 2, the first and/or second sealing members comprise an annular seal 20, such as an O-ring, and a filter 21, such as a mesh or sheet, extending across the central opening of said seal 20.

Preferably the main body 2 is a solid block, e.g. of stainless steel, brass, hasteloy.

Preferably the main body 2 is made of a heat conducting material, e.g. a metal, and the liners 6 are in contact with said main body essentially over their entire outer surface so that an optimum heat transfer is obtained.

Preferably the volume of the experimentation chamber 20 is at most 1 ml.

Figure 3:
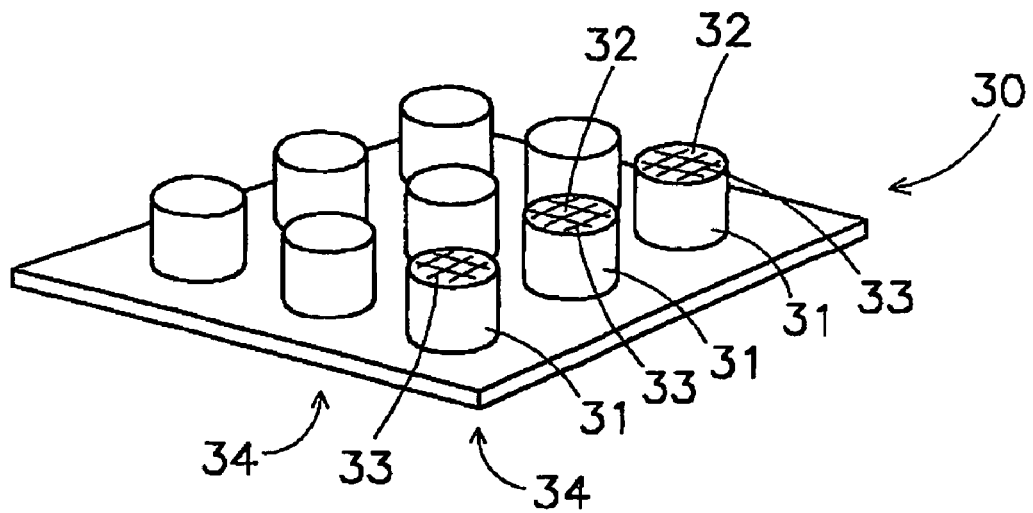

FIG. 3 shows a part of a filtration device 30 to be used in combination with the experimentation assembly of the invention, e.g. according to FIG. 1.

The filtration device 30 has channels 31 with inlets 32 corresponding to the bores 5 in the main body 2 of the experimentation assembly 1 and a filter 33 in each channel 31.

The filtration device 30 and the assembly 1 are preferably used so that—after removal of the top cover plate of the experimentation assembly 1 when in horizontal position and removal of the associated sealing member(s)—said filtration device 30 can be brought against the top face of the main body 2, after which said system is reversed and the contents of the experimentation chambers 20 enters the channels 31 in the filtration device 30 and is filtered by the filters 33.

Figure 4:
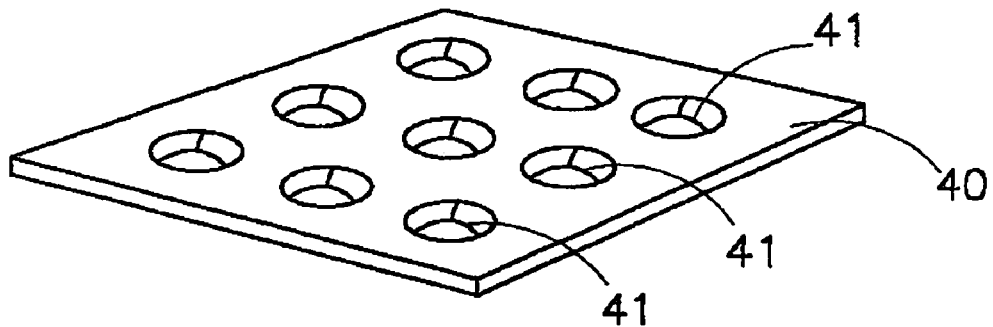
FIG. 4 shows a collecting device.

The channels 32 in the filtration device 30 have outlets 34. If the system further comprises a collecting device 40, e.g. as shown in FIG. 4, having collecting chambers 41 with inlets corresponding to the outlets of the filtration device 30 the filtered contents of the experimentation chambers can enter said collecting chambers 41.

The assembly 1 allows for the efficient use of a press device having multiple press members corresponding to the liners of the experimentation assembly for pressing said liners 6 into and/or out of the bores 5 of the main body 2.

As mentioned before the assembly 1 can be used preferably in combination with heating means, e.g for heating and thereby possibly evaporating a liquid content in the experimentation chambers 20 or for bringing a solid into solution which can the for crystals as it is cooled down.

The heating means can either be mounted in the main body 2 and/or cover plate(s) 12, 18 or be brought into contact with the main body 2 and/or cover plate(s) 12,18.

Figure 5:
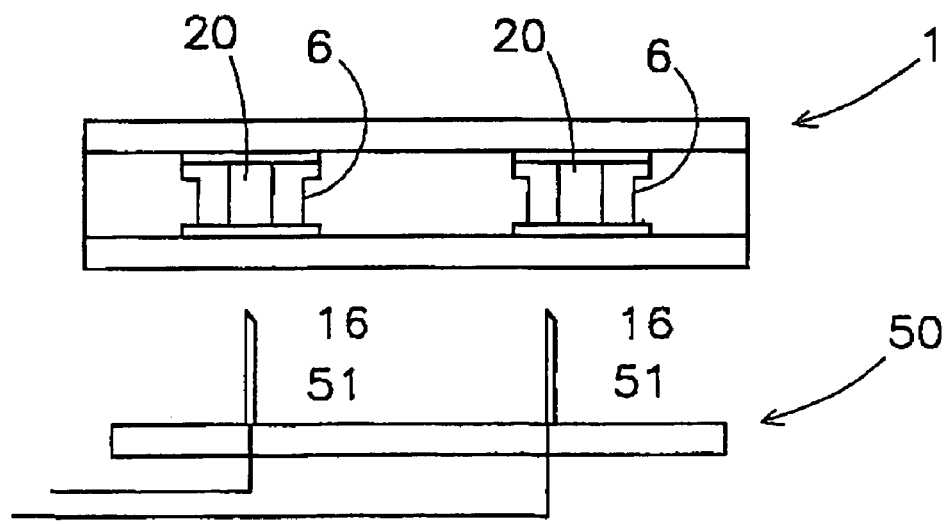
FIG. 5 shows a vapour discharge assembly.

If evaporation of a part of the content of the experimentation chambers 20 is desired, it is preferred that the system further comprises a vapour discharge assembly 50 e.g. as shown in FIG. 5.

The assembly 50 comprises multiple hollow needle members 51, which are each adapted to be pierced through a sealing member 11, 16 so that vapour discharges via said hollow needle 51.

As is shown in FIG. 5 the needles 51 are preferably upwardly directed and arranged to pierce through the sealing members 16 sealing the bottom face of the experimentation assembly 50 in horizontal orientation. This allows bringing the point of the hollow needles well above a liquid level in the experimentation chambers 20 so that vapour will escape through said needles 51.

It will be clear that the assembly 50 can also be used to drain a part of any liquid contents from the experimentation chambers.

In another embodiment a feed assembly is provided for feeding a substance into the experimentation chambers 20, said feed assembly comprising at least one hollow needle member adapted to be pierced through a sealing member. The introduction into the chambers 20 can be done from below or above.

For instance in the field of crystallisation experiments such a feed assembly allows for the introduction of an anti-solvent into the experimentation chambers.

The invention claimed is:

1. An assembly for performing parallel chemical experiments, said assembly comprising:

a main body having a first and a second face on opposite sides thereof, multiple bores extending through said main body between said first and second face, liners each having an opening at the first face of the main, each liner removably fitting in a bore in the main body, the liners are each provided at the first face of the main body with at least one outwardly directed support projection, and the bores in the main body are each provided with a corresponding recess for receiving the support projection, and first closure means for closing the openings of the liners at the first face of the main body, which first closure means comprise one or more elastic first sealing members and a first cover plate, so that said first sealing members are interpositioned between the ends of the liners and the first cover plate, said first closure plate being fastenable to said main body, so that a closed experimentation chamber is defined within each liner, wherein the liners are tubular liners, each liner also having openings at opposite ends thereof, and wherein second closure means are provided for closing the openings of the liners at the second face of the main body, said second closure means comprising one or more second elastic sealing members and a second cover plate which is fastenable to the main body, so that said second sealing members are interpositioned between the ends of the tubular liners and the second cover plate.

2. Assembly according to claim 1, wherein said first closure means comprise multiple first sealing members, each first sealing member engaging an end face of a liner.

3. Assembly according to claim 2, wherein at least one of the first face of the main body and the first cover plate is provided with recesses at the locations of the liner ends for receiving a first sealing member.

4. Assembly according to claim 1, wherein said second closure means comprise multiple sealing members, each second sealing member engaging an end face of a liner.

5. Assembly according to claim 4, wherein at least one of the second face of the main body and the second cover plate is provided with recesses at the locations of the liner ends for receiving a second sealing member.

6. Assembly according to claim 1, wherein at least one of the first and the second cover plate is provided with bores extending in line with the bores of the main body, and wherein at least one of the first and second sealing members are pierceable.

7. A method for performing parallel chemical experiments, wherein use is made of a system comprising:

an assembly for performing parallel chemical experiments, said assembly comprising:

a main body having a first and a second face on opposite sides thereof, multiple bores extending through said main body between said first and second face, tubular liners having openings at opposite ends thereof, each liner removably fitting in a bore in the main body, the liners are each provided at the first face of the main body with at least one outwardly directed support projection, and the bores in the main body are provided with a corresponding recess for receiving the support projection, and first closure means for closing the openings of the liners at the first face of the main body, which first closure means comprise one or more elastic first sealing members and a first cover plate, so that said first sealing members are interpositioned between the ends of the liners and the firs cover plate, second closure means for closing the openings of the liners at the second face of the main body, and said second closure means comprising one or more second elastic sealing members and a second cover plate which is fastenable to the main body, so that said second sealing members are interpositioned between the ends of the tubular liners and the second cover plate, said first and second closure means being fastenable to said main body, so that an experimentation chamber is defined within each liner, and a filtration device having channels with inlets corresponding to the bores in the main body of the experimentation assembly and a filter in each channel, which method comprises the steps of:

removing of the top cover plate of the experimentation assembly when in horizontal position and of the associated at least one sealing member, bringing said filtration device against the top face of the main body, and subsequently reversing said system such that the contents of the experimentation chambers enters said channels in the filtration device and is filtered.

8. A method according to claim 7, wherein said channels in said filtration device have outlets and wherein said system further comprises a collecting device having collecting chambers with inlets corresponding to the outlets of the filtration device, such that the filtered contents of the experimentation chambers enters said collecting chambers.

9. A method according to claim 7, wherein the parallel chemical experiments are crystallisation experiments and crystallisation is effected in the experimentation chambers.

10. A method according to claim 7, wherein the parallel chemical experiments include solid form screening of molecules.

11. A method according to claim 10, wherein the solid form screening of molecules is for active pharmaceutical ingredients.

12. A method according to claim 10, wherein the solid form screening of molecules is selected from the group consisting of salt screening, polymorph screening, and enantiomer separation screening.

13. Assembly according to claim 1, wherein the parallel chemical experiments are crystallisation experiments.

14. A method according to claim 7, wherein:
the main body of said assembly for performing parallel chemical experiments is a solid body of a heat conducting material, and at least one of the first and second closure means comprise sealing members which are pierceable, and said method further comprising the steps of:

heating the content in the experimentation chambers using heating means, wherein said heating means are mounted in contact with at least one of said main body and cover plate, thereby creating a vapor in at least one of the experimentation chambers, and discharging said vapor from the system using a vapor discharge assembly, said vapor discharge assembly comprising multiple hollow needle members, each adapted to be pierced through a sealing member so that vapor discharges via said hollow needle members.

15. A method according to claim 14, wherein said needle members are upwardly directed and arranged to pierce through the sealing members sealing the bottom face of the experimentation assembly in horizontal orientation.

16. A method according to claim 14, wherein the system that is used further comprises a feed assembly for feeding a substance into the experimentation chambers, said feed assembly comprising at least one hollow needle member adapted to be pierced through a sealing member.

17. An assembly for performing parallel chemical experiments, said assembly comprising:

a main body having a first and a second face on opposite sides thereof, multiple bores extending through said main body between said first and second face, liners each having an opening at the first face of the main body, each liner removably fitting in a bore in the main body, the liners are each provided at the first face of the main body with at least one outwardly directed support projection, and the bores in the main body are provided with a corresponding recess for receiving the support projection, and first closure means for closing the openings of the liners at the first face of the main body, which first closure means comprise one or more elastic first sealing members and a first cover plate, so that said first sealing members are interpositioned between the ends of the liners and the first cover plate, said first closure plate being fastenable to said main body, so that a closed experimentation chamber is defined within each liner, wherein the liners are tubular liners, each liner also having openings at opposite ends thereof, and wherein second closure means are provided for closing the openings of the liners at the second face of the main body, said second closure means comprising one or more second elastic sealing members and a second cover plate which is fastenable to the main body, so that said second sealing members are interpositioned between the ends of the tubular liners and the second cover plate, and a filtration device, separate from the main body, said filtration device comprising a plate having multiple channels, with inlets corresponding to the bores in the main body of the experimentation assembly and a filter in each channel.

18. Assembly according to claim 17, wherein the parallel chemical experiments are crystallisation experiments.

* * * * *

UNITED STATES PATENT AND TRADEMARK OFFICE
CERTIFICATE OF CORRECTION

PATENT NO. : 7,608,222 B2
APPLICATION NO. : 10/523732
DATED : October 27, 2009
INVENTOR(S) : Blomsma et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1007 days.

Signed and Sealed this

Twelfth Day of October, 2010

David J. Kappos
*Director of the United States Patent and Trademark Office*